July 17, 1951  E. H. BICKLEY  2,561,170

MECHANISM FOR CRACKING NUTS

Filed April 12, 1947  2 Sheets-Sheet 1

INVENTOR
EVERETT H. BICKLEY
BY
Barr, Borden & Foy
ATTORNEYS

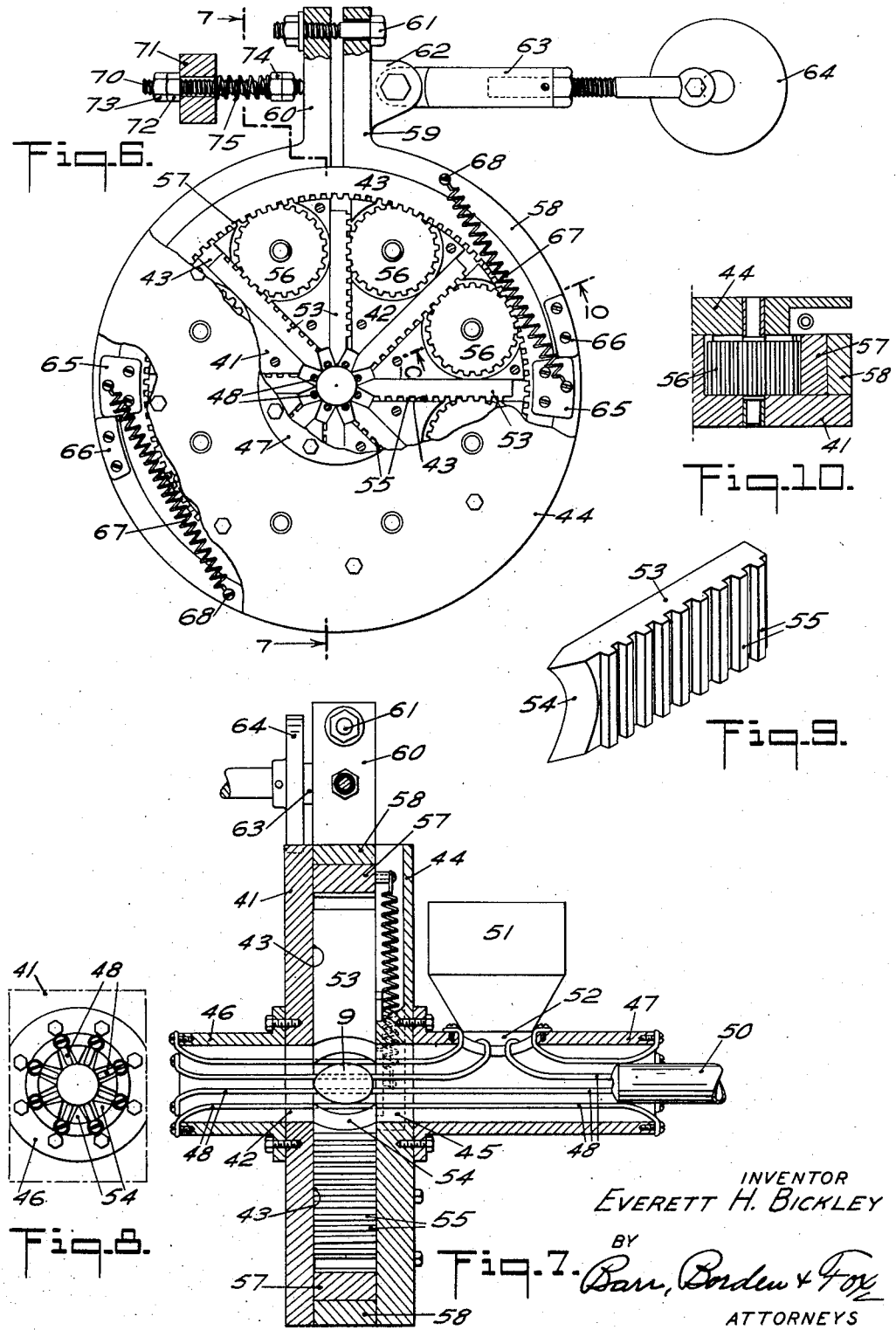
July 17, 1951 — E. H. BICKLEY — 2,561,170
MECHANISM FOR CRACKING NUTS
Filed April 12, 1947 — 2 Sheets-Sheet 2
INVENTOR
EVERETT H. BICKLEY
BY
Barr, Borden & Fox
ATTORNEYS Patented July 17, 1951

2,561,170

UNITED STATES PATENT OFFICE 2,561,170

MECHANISM FOR CRACKING NUTS

Everett H. Bickley, Bala-Cynwyd, Pa.

Application April 12, 1947, Serial No. 741,012

1 Claim. (Cl. 146—8)

The present invention relates generally to nut cracking apparatus and more particularly to thin shell nuts such as pecans or the like.

In nut cracking mechanisms heretofore devised the cracking of the nut shell is accompanied by considerable damage to the meat or kernel and as a result the value is decreased, the cost of preparation for marketing is increased, the number of particles to be sorted are greatly increased and the difficulty of removal of worms by sifting is rendered impossible, making hand sorting imperative and difficult. This latter is a tedious, uncertain and expensive operation because the percentage of broken pieces is very high and the percentage of perfect meats very low. Furthermore, in the case of pecans no one heretofore has devised a machine which breaks the shell in such a manner that the internal projections or ribs on the shell are released from the meat without breaking off the lobes or parts of lobes of the meat.

Some of the objects of the present invention are: to provide an improved nut cracking mechanism; to provide a nut cracking apparatus for fracturing the shell of a nut with the meat unbroken; to provide a nut cracking apparatus wherein the cracking forces are applied in such predetermined locations about the body of a nut as to cause all nut fragments to be dispersed outwardly without carrying any portions of the meat along with them; to provide a nut cracking apparatus wherein dry and dampened nuts are cracked with facility to leave the meat or kernel intact; to provide a nut cracking apparatus wherein provision is made for holding a nut in proper position for cracking and thereafter causing a fracturing impact to break the shell into fragments of minimum size; to provide a nut cracking apparatus wherein the motion of the shell in being fractured into many pieces only moves a distance approximately the thickness of the shell or less; and to provide other improvements as will hereinafter appear.

Figure 5:
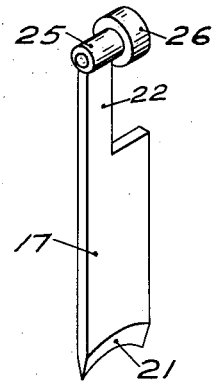
Figure 3:
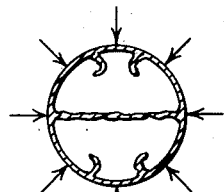
Figure 1:
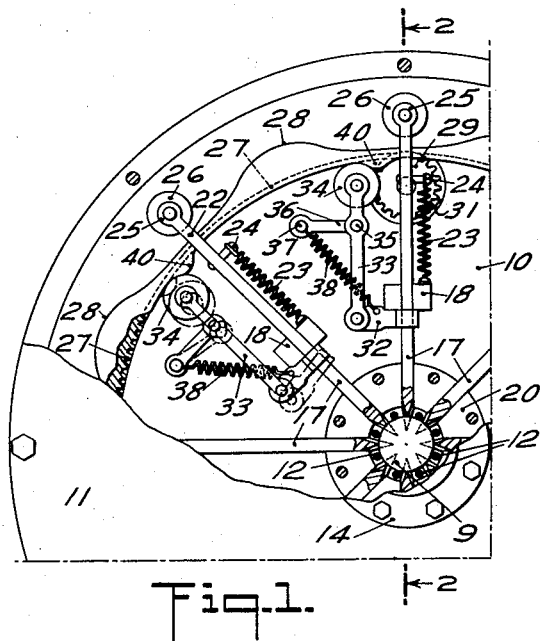
Figure 2:
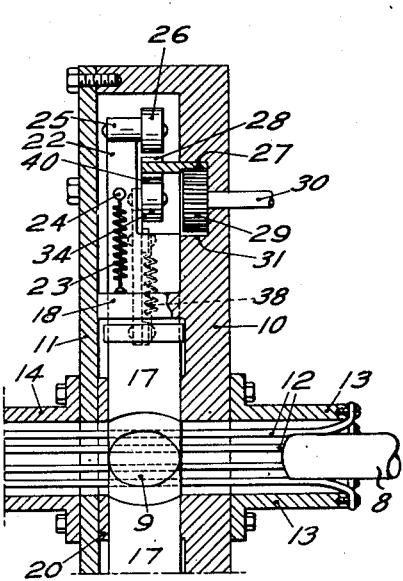
Figures 4, 11:
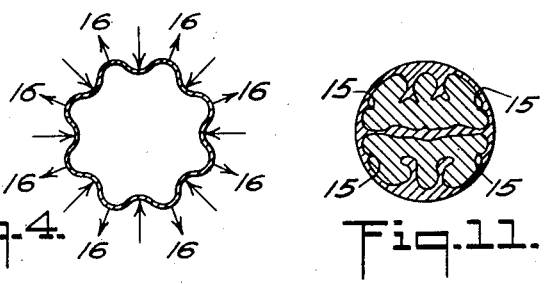

In the accompanying drawings, Fig. 1 represents a side elevation of a quadrant of a circular nut cracking apparatus embodying one form of the present invention, the cover plate being broken away to show two of the eight cracking elements and operating parts thereof; Fig. 2 represents a section on line 2—2 of Fig. 1; Fig. 3 represents diagrammatically the lines of force acting upon a nut; Fig. 4 represents diagrammatically the fraction points resulting from the applied forces; Fig. 5 represents a perspective of any one of the nut cracking blades; Fig. 6 represents a side elevation, partly broken away, of a nut cracking unit embodying a modified form of the invention; Fig. 7 represents a section on line 7—7 of Fig. 6; Fig. 8 represents a detail in end elevation of the nut guiding and positioning runway; Fig. 9 represents a perspective of any one of the cracking blades of the modification shown in Figs. 6 and 7; Fig. 10 represents a section on line 10—10 of Fig. 6; and Fig. 11 represents a transverse section of a pecan nut.

Referring to Figs. 1 to 5 of the drawings a form of the invention is shown wherein a receptacle 10 with a cover plate 11 forms a housing for the nut cracking mechanism of the present invention. These two parts of the housing are centrally apertured to form a passage for a nut 9, which is fed into position within the receptacle by means of a plurality of flexible wires 12 having ends respectively secured to and supported by oppositely disposed projecting tubes 13 and 14 anchored respectively to the receptacle 10 and the cover plate 11. The inlet ends for receiving a nut are flared outwardly and attached to the tube 13, thereby providing a converging inlet portion leading to the passage which brings the nut to cracking position. A pusher plunger 8 serves to feed the nuts along the guide way formed by the wires 12. This flexible wire construction thus becomes self-adjusting for nut size variation and ensures every nut being properly held. In the present instance there are eight wires forming the runway, all equally spaced a predetermined distance apart for a purpose to be presently described.

In explaining the cracking of the shell of a pecan nut in the manner required to obtain unbroken nut meat or kernels, attention is directed to Fig. 11 from which it will be observed that the nut shell is formed internally at certain spaced intervals with longitudinal ribs 15, which interfit with the nut meat and conform so precisely with the respective depressions which define the irregular meat lobe shapes, as to require most exact fracture of the shell to prevent these ribs from breaking off the lobes. In accordance with the present invention, such breaking of the nut meat does not take place because the points of fracture are so distributed that the applied cracking forces operate to distend or bulge each section of shell outwardly between each pair of such forces. It has been found that at least eight cracking forces are required to overcome the undesirable breaking of the nut meat, such forces generally being applied as shown in Fig. 3, with the resulting casting out of certain of the shell parts, as indicated by arrows 16 in Fig. 4. In other words, a definite predetermined number of cracking forces are so applied as to compress and break the shell into such small segments that all of the meat interlocking or dovetailing parts are completely broken up so that all of the lobes are released as a complete integral part of the nut meat.

For the purpose of applying the aforesaid cracking forces and in the manner of the invention, eight cracking blades 17 are provided, the same being radially arranged about a common center and respectively mounted for sliding movement in guide lugs 18 and guideways formed radially in a central hub 20. As here shown, the lugs 18 and hub 20 are formed integral with the inner face of the receptacle 10. The positioning of the blades 17 is such that each, as reciprocated, rides between two adjacent wires 12 of the basket-like passage for the nut. Each blade 17 is of the shape shown in Fig. 5, having a curved cracking face 21 contoured to conform to the body shape of the nut, and also having an extension 22 for attachment to certain operating adjuncts. While Fig. 1 shows but two of the eight circumferentially arranged blade operating mechanisms, it is to be understood that the remaining six are of like construction. The present description will be limited to one cracking unit with all like parts of the others being similarly identified.

For reciprocating the blades 17, each is biased to move toward and into contact with a nut 9 in the hub 20 by a spring 23 tensioned between a pin 24 on the extension 22 and the guide lug 18 for that blade 17. The outward movement of the blade 17 takes place in timed relation by forming an eye 25 on the end of the extension 22 to journal the shaft of a roller 26, which is laterally offset to ride in the path of a cam ring 27 and be intermittently projected outwardly by dwells 28, of which there are, in this instance, the same number as there are cracking blades 17. Part of the cam ring 27 is in the form of an internal ring gear concentric with the hub 20 and arranged to be driven by a pinion 29 keyed to an external shaft 30 receiving power from a suitable source. As shown, the receptacle 10 is provided with a circumferential face groove 31 in which one portion of the gear ring 26 rides, while the projecting portion thereof is disposed in alinement with the roller 26 for operation of the latter by the dwells 28. From the foregoing, it will be seen that the action of the spring 23 is to bias the blade 17 inward into contact with the outer face of a nut, when the latter has reached its cracking position, while withdrawal of the blade 17 against the tension of the spring 23 is caused by a dwell 28 engaging the roller 26 as the gear ring 27 is rotated.

In order to crack the nut after it has been gripped by the blades 17, an arm 32 is provided having a slotted end to fit about the blade 17 with such clearance as to permit free relative sliding of the blade 17 when the arm 32 is positioned perpendicular to such blade 17. The other end of the arm is pivotally supported on the end of a link 33 carrying a roller 34 and pivoted at 35 intermediate its ends to a rock arm 36, which in turn is pivoted upon a pin 37 projecting from the receptacle 10. The arm 32 is normally held in free sliding position by a spring 38 stretched between the pin 37 and the arm 32 to hold the arm abutting the guide lug 18 as a stop, and normally prevent the binding or clamping action upon the blade 17. The length of the link 33 is such that the roller 34 rides in contact with the smooth portion of the cam ring 27 and in the path of eight inwardly disposed dwells 40. In consequence, when a dwell 40 kicks the roller 34 inwardly, the link 33 turns on its pivot 37 to thereby tilt the arms 32, as shown in dotted lines, so that its slot grips the blade 17 to transmit the quick inward kick to the blade 17 and crack the portion of the nut contacted. Since all of the other blades 17 simultaneously receive the same inward kick, the nut shell is broken at the eight places and the small broken bits of shell fall away without carrying any of the nut lobes along.

In the form of the invention shown in Figs. 6 to 10, the receptacle is in the form of a circular block 41 having an axial bore 42 as a passage for the nuts, and also having a plurality of radially disposed ways 43 communicating with the bore 42. A cover plate 44 is provided having an axial hole 45 forming a continuation of the aforesaid nut passage. Oppositely disposed tubular members 46 and 47 are respectively mounted on the block 41 and the plate 44, coaxially with respect to the hole 42, and these members serve to support the nut-guiding wires 48 which pass through the block and plate to bring each nut into cracking position in the bore 42 through medium of a pusher plunger 50. As shown, a hopper 51 is mounted upon the member 47 for feeding the nuts one at a time into the basket-like guide formed by the wires 48, these latter having some bent upward to form a diverging inlet 52 to receive nuts dropping through the open bottom of the hopper.

The modified cracking mechanism comprises eight blades 53 mounted for sliding reciprocating movement in the respective ways 43, all of which are similarly actuated so this description will be limited to those shown in Fig. 6. Each blade 53 has a cracking face 54 contoured to seat against the curved body of the nut, while one lengthwise face thereof is formed with a rack gear 55.

For reciprocating a blade 53, a pinion 56 is journalled in the block 41 and plate 44, as shown in Fig. 10, and meshes with the rack gear 55 at one portion and with a driven ring gear 57, which latter is arranged to be oscillated through an arcuate path predetermined by the desired radial or cracking movement of the blades 53. As shown, this blade movement is brought about through the medium of a clutch ring 58 encircling the ring gear 57 and radially split at one portion to provide two outwardly disposed radial arms 59 and 60, which are apertured to receive a fastening bolt 61, which is adjustable for wear. This bolt 61 is freely slidable through the arm 59 but threaded into the other arm 60, and therefore under one condition of operation the two arms can move towards each other to clamp the ring 58 to the ring gear 57. The initial adjustment is such that the clutch ring 58 rides freely about the periphery of the ring gear 57. An ear 62 on the arm 59 forms a connection for a rod 63 adjustably joined at its other end to an eccentric crank 64 driven from a suitable source.

In order to transmit motion of the clutch ring 58, the ring gear 57 has two stops 65 fixed thereto, preferably at diametrically opposite locations, and each stop projects radially along one side of the clutch ring 58, where it is in the path of a clutch stop 66 fixed to the side of the clutch ring 58. From each stop 65 a tension spring 67 is stretched to a pin 68 fixed to the clutch ring 58.

For the purpose of producing the relatively short cracking kick to the blades 53, a bolt 70 is journalled for lengthwise sliding movement in a fixed bearing 71, and projects at one end into the path of the clutch arm 60, and at the other end to receive a fracture-adjusting nut 72 held by a lock nut 73. The end adjacent the arm 60 mounts a nut 74 which serves to adjust the tension of a spring 75 coiled about the shank of the bolt 70 and abutting the fixed bearing 71.

In the operation of this modified form of the invention, a nut will take the position shown in Figs. 6 and 7, whereupon the action of the eccentric 64 will move the clutch arm 59 (and the ring gear 43) to the left as viewed in Fig. 6, until the blades 53 contact the nut 9 by means of the pinion 56, whereupon the stops 66 will move away from the stops 65 and the retracting springs 67 will stretch until the arm 60 contacts the bolt 70. The continued travel of the rod 63 compresses the spring 75, thereby causing the clutch ring 58 to grip the ring gear 57 and thereby transmit a common impact to all of the blades to crack the nut into fragments. On the return stroke of the eccentric 64 and rod 63, the stops 66 engage the stops 65 thereby turning the ring gear 43 clockwise. This causes the blades 53 to be retracted, freeing the cracked nut so that it may be ejected by the pusher plunger 50.

In order to more readily center the nut in the wire cage 48 compressed air of small volume at high pressure may be introduced through the hollow plunger 50.

Having thus described my invention, I claim:

A nut cracking apparatus comprising a receptacle having a centrally disposed bore and a plurality of peripheral radially disposed grooves communicating with said bore, a nut guideway in the form of a plurality of wires extending lengthwise of said bore and circumferentially spaced coaxially of said bore, means to feed a nut along said guideway into the plane of said grooves, a plurality of cracking blades slidable respectively in said grooves and each arranged to pass between a pair of said wires to engage a nut, spring means freely urging said blades against the nut, cam operated friction grip means operatively connected to each of said blades, cam means to operate said grip means to simultaneously actuate said blades to crack the nut, and additional cam means to return said blades simultaneously to release a cracked nut.

EVERETT H. BICKLEY.

REFERENCES CITED

The following references are of record in the file of this patent:

UNITED STATES PATENTS

| Number | Name | Date |
| --- | --- | --- |
| 353,143 | Koerber | Nov. 23, 1886 |
| 709,811 | Baker et al. | Sept. 23, 1902 |
| 807,052 | Werner | Dec. 12, 1905 |
| 947,932 | Peckham | Feb. 1, 1910 |
| 990,294 | Roach | Apr. 25, 1911 |
| 1,060,648 | Suzzi | May 6, 1913 |
| 1,725,224 | Sturges | Aug. 20, 1929 |
| 2,067,566 | Field | Jan. 12, 1937 |
| 2,089,544 | Denison | Aug. 10, 1937 |
| 2,154,412 | Romberg et al. | Apr. 11, 1939 |
| 2,212,213 | Rothenberger | Aug. 20, 1940 |
| 2,283,876 | Mejias | May 19, 1942 |